United States Patent
Nomura

(10) Patent No.: US 10,643,077 B2
(45) Date of Patent: May 5, 2020

(54) IMAGE PROCESSING DEVICE, IMAGING DEVICE, EQUIPMENT CONTROL SYSTEM, EQUIPMENT, IMAGE PROCESSING METHOD, AND RECORDING MEDIUM STORING PROGRAM

(71) Applicant: Yasuhiro Nomura, Kanagawa (JP)

(72) Inventor: Yasuhiro Nomura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/665,869

(22) Filed: Aug. 1, 2017

(65) Prior Publication Data
US 2018/0060671 A1 Mar. 1, 2018

(30) Foreign Application Priority Data
Aug. 25, 2016 (JP) .................................. 2016-164812

(51) Int. Cl.
*G06K 9/00* (2006.01)
*H04N 13/239* (2018.01)
(Continued)

(52) U.S. Cl.
CPC ............ *G06K 9/00771* (2013.01); *B60T 7/12* (2013.01); *B60T 7/22* (2013.01); *B60W 30/08* (2013.01);
(Continued)

(58) Field of Classification Search
CPC ............ G06K 9/00771; G06K 9/3208; H04N 13/128; H04N 13/246; H04N 13/296; H04N 13/239; G01B 11/14
(Continued)

(56) References Cited

U.S. PATENT DOCUMENTS

2009/0167931 A1 7/2009 Kanai et al.
2010/0283837 A1 11/2010 Oohchida et al.
(Continued)

FOREIGN PATENT DOCUMENTS

JP 2001-160137 6/2001
JP 2009-157123 7/2009
(Continued)

OTHER PUBLICATIONS

Extended European Search Report dated Jan. 2, 2018 in European Patent Application No. 17183940.0, 12 pages.
Japanese Office Action dated Feb. 4, 2020 in Japanese Application No. 2016-164812, filed Aug. 25, 2016.

* cited by examiner

*Primary Examiner* — Joseph G Ustaris
*Assistant Examiner* — Matthew David Kim
(74) *Attorney, Agent, or Firm* — Oblon, McClelland, Maier & Neustadt, L.L.P.

(57) ABSTRACT

An image processing device, an imaging device, an equipment control system, equipment, an image processing method, and a recording medium storing a program. The image processing device and the image processing method includes capturing an object to obtain a captured image using at least one capturing unit, generating a correction parameter based on the captured image to update a correction parameter stored in a memory, correcting displacement in coordinate caused to the captured image, using the updated correction parameter, and updating a referring status of a specific thing included in the captured image to a not-yet-referred status when the correction parameter is updated. The imaging device includes the image processing
(Continued)

device, the at least one capturing unit captures an image including the specific thing, and the memory stores the correction parameter.

15 Claims, 6 Drawing Sheets

(51) Int. Cl.
　　　*H04N 13/246*　　　(2018.01)
　　　*H04N 13/296*　　　(2018.01)
　　　*H04N 13/128*　　　(2018.01)
　　　*G08G 1/16*　　　(2006.01)
　　　*G01S 13/00*　　　(2006.01)
　　　*G06T 7/80*　　　(2017.01)
　　　*B60T 7/12*　　　(2006.01)
　　　*B60W 30/08*　　　(2012.01)
　　　*B60T 7/22*　　　(2006.01)
　　　*G06K 9/32*　　　(2006.01)
　　　*G01B 11/24*　　　(2006.01)

(52) U.S. Cl.
　　　CPC .......... *G01S 13/00* (2013.01); *G06K 9/00791* (2013.01); *G06K 9/00805* (2013.01); *G06K 9/3208* (2013.01); *G06T 7/85* (2017.01); *G08G 1/166* (2013.01); *H04N 13/128* (2018.05); *H04N 13/239* (2018.05); *H04N 13/246* (2018.05); *H04N 13/296* (2018.05); *B60T 2201/022* (2013.01); *G01B 11/24* (2013.01); *G06T 2207/10021* (2013.01); *G06T 2207/30252* (2013.01); *G08G 1/168* (2013.01)

(58) Field of Classification Search
　　　USPC ........................................... 348/143
　　　See application file for complete search history.

(56) References Cited

U.S. PATENT DOCUMENTS

| | | | |
|---|---|---|---|
| 2011/0007158 A1* | 1/2011 | Holtz ................... G01S 3/7865 |
| | | | 348/143 |
| 2012/0224069 A1 | 9/2012 | Aoki | |
| 2012/0236124 A1 | 9/2012 | Aoki | |
| 2014/0176755 A1* | 6/2014 | Narita ..................... G06T 5/006 |
| | | | 348/222.1 |
| 2014/0184812 A1* | 7/2014 | Tsuji .................. H04N 5/23219 |
| | | | 348/169 |
| 2015/0022678 A1* | 1/2015 | Tsubaki ............. H04N 5/23254 |
| | | | 348/208.5 |
| 2015/0243017 A1 | 8/2015 | Fujimoto et al. | |
| 2015/0363636 A1 | 12/2015 | Tate et al. | |
| 2016/0210733 A1 | 7/2016 | Kikuchi et al. | |
| 2016/0227188 A1 | 8/2016 | Aoki et al. | |
| 2016/0267631 A1* | 9/2016 | Shen ....................... G06T 5/009 |
| 2016/0284088 A1 | 9/2016 | Kikuchi | |
| 2016/0353083 A1 | 12/2016 | Aoki et al. | |
| 2017/0070725 A1 | 3/2017 | Kishiwada et al. | |
| 2017/0201736 A1* | 7/2017 | Ishimaru .................. G01C 3/06 |

FOREIGN PATENT DOCUMENTS

| | | |
|---|---|---|
| JP | 2012-58188 | 3/2012 |
| JP | 2014-138331 | 7/2014 |
| JP | 2016-1447 | 1/2016 |
| WO | WO 2012/035983 A1 | 3/2012 |

IMAGE PROCESSING DEVICE, IMAGING DEVICE, EQUIPMENT CONTROL SYSTEM, EQUIPMENT, IMAGE PROCESSING METHOD, AND RECORDING MEDIUM STORING PROGRAM

CROSS-REFERENCE TO RELATED APPLICATION

This patent application is based on and claims priority pursuant to 35 U.S.C. § 119(a) to Japanese Patent Application No. 2016-164812, filed on Aug. 25, 2016, in the Japan Patent Office, the entire disclosure of which is hereby incorporated by reference herein.

BACKGROUND

Technical Field

The present disclosure relates to an image processing device, an imaging device, an equipment control system, equipment, an image processing method, and a recording medium storing a program.

Background Art

A technology to correct the displacement in coordinate on the captured images due to the displacement over time of an imaging device is known in the art. Such a technology is used, for example, to correct the displacement in coordinate of the images captured by a stereo camera that serves as the imaging device.

A stereo camera is provided with two capturing units, and the stereo camera uses these two capturing units to capture the same object at the same time. By so doing, the distance to a specific thing such as an obstacle included in the object can be calculated from the difference between the object images on the captured images. Such stereo cameras are mounted, for example, in a vehicle, and used for vehicle control systems. A vehicle control system repeatedly performs capturing and distance measuring at fixed frame intervals, and generates video of the disparity images that contain the information about the distance to a specific thing included in the object of the captured image. The vehicle control system detects, for example, an obstacle or a deviation from a line, using the generated disparity image, and uses the results of detection for avoidance control or the like.

In order for such a stereo camera to measure the distance with precision, the distortion characteristics of the camera provided for each of the capturing units or the relative positions of the elements such as an imaging element should be known in advance. However, in reality, slight deformation of an imaging device due to, for example, changes over time and temperature characteristics is unavoidable. For this reason, automatic calibration is performed in stereo cameras to correct the displacement of coordinates on the captured images in parallel with distance measuring operation that is performed at regular time intervals. In the automatic calibration, displacement in the properties and characteristics of the camera such as the relative positions or directions of the two capturing units is measured using the captured images or the data obtained from other various kinds of sensors or the like, and the displacement of the coordinates of the captured images is corrected.

SUMMARY

Embodiments of the present disclosure described herein provide an image processing device, an imaging device, an equipment control system, equipment, an image processing method, and a recording medium storing a program. The image processing device and the image processing method includes capturing an object to obtain a captured image using at least one capturing unit, generating a correction parameter based on the captured image to update a correction parameter stored in a memory, correcting displacement in coordinate caused to the captured image, using the updated correction parameter, and updating a referring status of a specific thing included in the captured image to a not-yet-referred status when the correction parameter is updated.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
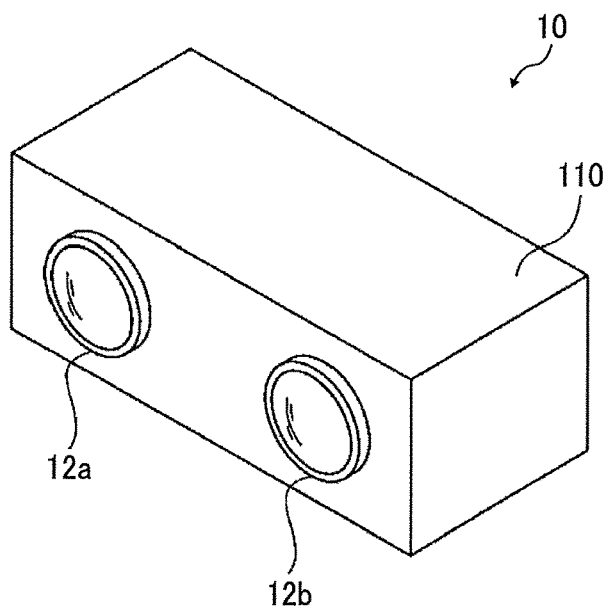
FIG. 1 is a perspective view of a stereo camera according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an image processing device, an imaging device, a recording medium storing a program (carrier means), an equipment control system, and equipment according to an embodiment of the present disclosure are described in detail with reference to the accompanying drawings. Firstly, a stereo camera that is an example of an imaging device, and a vehicle (i.e., an example of equipment) provided with the stereo camera are described.

FIG. 1 is a perspective view of a stereo camera 10 according to the present embodiment.

Figure 2:
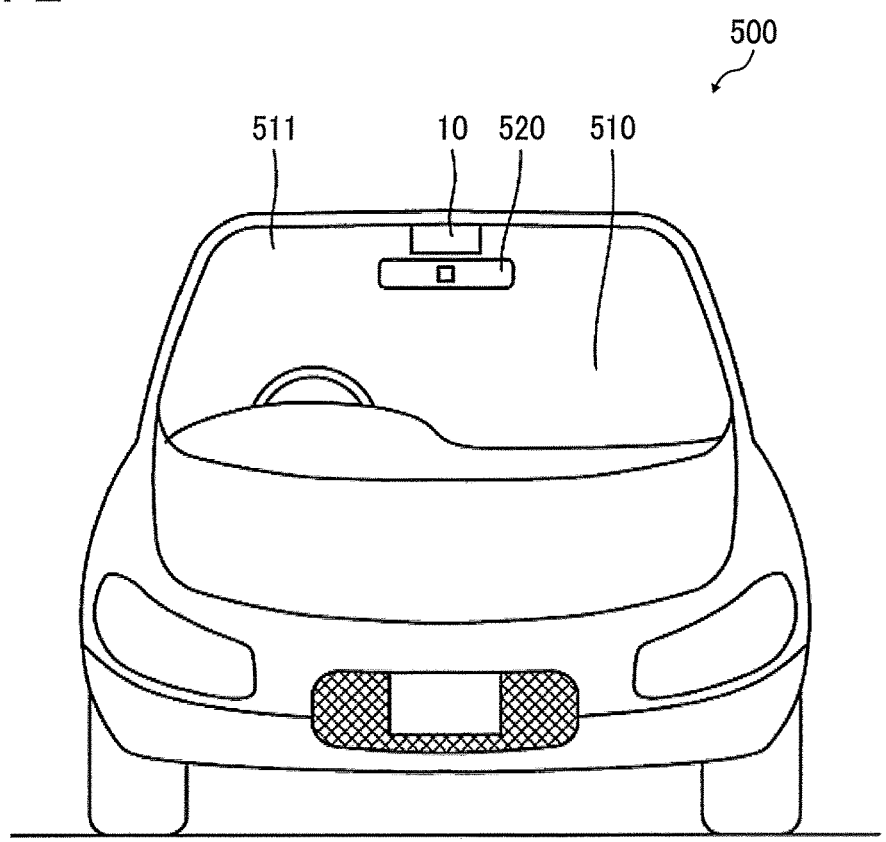
FIG. 2 is a front view of a vehicle according to an embodiment of the present disclosure.

FIG. 2 is a front view of a vehicle 500 for which the stereo camera 10 of FIG. 1 is provided, according to the present embodiment.

As illustrated in FIG. 1, a pair of taking lenses 12a and 12b are exposed to outside from a housing 110 of the stereo camera 10. As illustrated in FIG. 2, the stereo camera 10 is attached to an upper portion of the inner surface (on an interior 510 side) of a front windshield 511 of the vehicle 500. More specifically, the stereo camera 10 is attached near the installed position of an inner rearview mirror 520 of the vehicle 500.

The installation position of the stereo camera 10 is not limited to the above-described position, but may be any position as long as the information used to recognize the conditions ahead of the vehicle 500 in the directions of travel can be obtained at such a position. In the present embodiment, the width direction (i.e., the right and left directions in FIG. 2) of the vehicle 500 is referred to as a vehicle width direction, and the penetrating direction in FIG. 2 is referred to as the directions of travel of the vehicle.

The stereo camera 10 is mounted in equipment whose distance to an object to be measured varies. The equipment for which the stereo camera 10 is provided is not limited to the vehicle 500 as in the present embodiment. For example, the stereo camera 10 may be mounted, for example, in a mobile object such as a ship or railway. Moreover, the stereo camera 10 may be used for factory automation (FA), and in such cases, the stereo camera 10 may be mounted, for example, in a fixture such as a building. As will be described later, the stereo camera 10 calculates the distance (obtains the distance data) to a specific thing (object to be measured), such as an obstacle included in the object, from the image data obtained by capturing an object. An object to be measured by the stereo camera 10 is, for example, another mobile object, a person, and an animal.

Next, a vehicle control system that is an example of an equipment control system, according to the present embodiment, is described.

Figure 3:
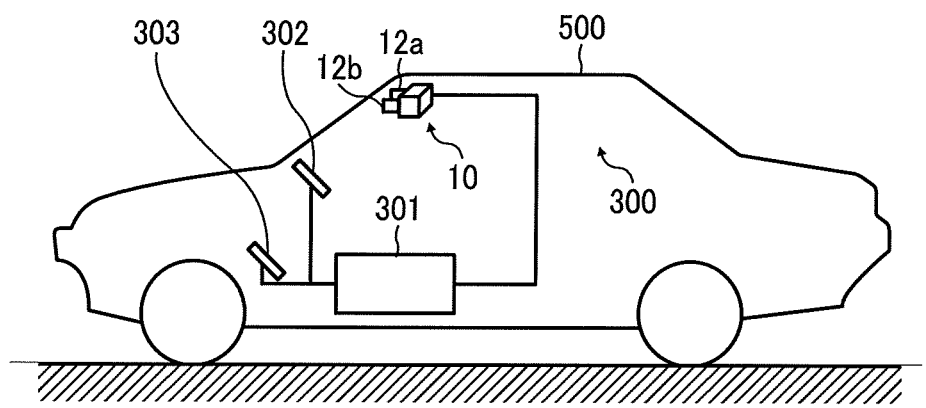
FIG. 3 is a diagram illustrating a schematic configuration of a vehicle control system according to an embodiment of the present disclosure.

FIG. 3 is a diagram illustrating a schematic configuration of a vehicle control system 300 according to the present embodiment.

As illustrated in FIG. 3, the stereo camera 10 is arranged so as to be able to capture an image in the directions of travel of the vehicle 500. For this reason, the taking lenses 12a and 12b are oriented in a predetermined direction. The vehicle control system 300 and the stereo camera 10 operate together to capture a specific thing (object to be measured) existing in the directions of travel of the vehicle 500. Note also that the vehicle control system 300 is an example of an equipment control system.

The vehicle control system 300 is provided with the stereo camera 10, a controller 301, a steering wheel 302, and a brake pedal 303.

Next, a hardware configuration of the stereo camera 10 according to the present embodiment is described.

Figure 4:
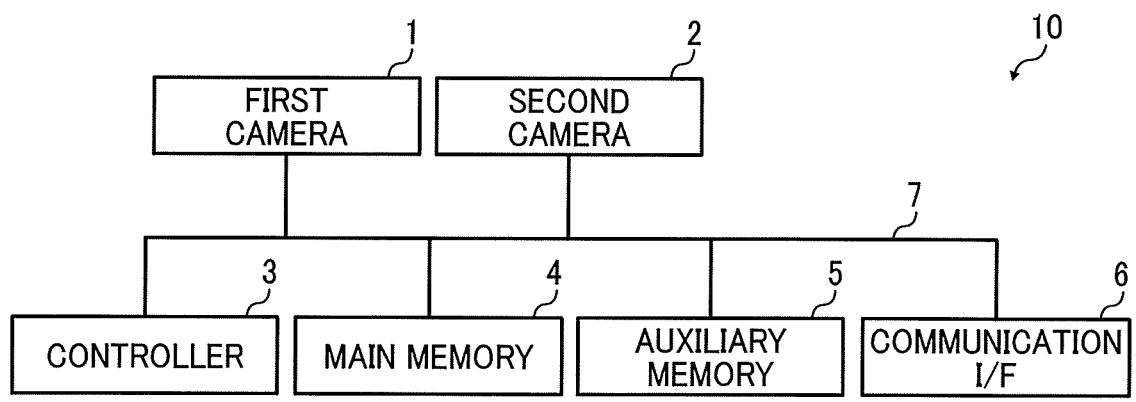
FIG. 4 is a schematic block diagram illustrating a hardware configuration of a stereo camera according to an embodiment of the present disclosure.

FIG. 4 is a schematic block diagram illustrating a hardware configuration of the stereo camera 10 according to the present embodiment.

As illustrated in FIG. 4, the stereo camera 10 includes a first camera 1 and a second camera 2 that are two discrete cameras. The first camera 1 is, for example, a discrete camera provided with an image pickup device corresponding to the taking lens 12a, and the second camera 2 is, for example, a discrete camera provided with an image pickup device corresponding to the taking lens 12b.

Further, the stereo camera 10 includes a controller 3, a main memory 4, an auxiliary memory 5, and a communication interface (I/F) 6. Note also that the first camera 1, the second camera 2, the controller 3, the main memory 4, the auxiliary memory 5, and the communication interface 6 are connected to each other through a bus 7.

Here, the relation between the stereo camera 10 and the vehicle control system 300 is described. The controller 301 of the vehicle control system 300, as illustrated in FIG. 3, performs various kinds of control on the vehicle 500 based on the data calculated and obtained from a disparity image 115 (see FIG. 6) received from the stereo camera 10. The disparity image 115 will be described later in detail.

For example, the controller 301 controls the operation of a steering system (controlled system) including a steering wheel 302 based on the distance to a specific thing calculated from the disparity image 115 received from the stereo camera 10. Due to this steering control, the operation of the vehicle 500 can be controlled so as to avoid a specific thing such as an obstacle existing in the directions of travel of the vehicle 500.

Moreover, the controller 301 controls the operation of a braking system (controlled system) including a brake pedal 303 based on the distance to a specific thing calculated from the disparity image 115 received from the stereo camera 10. Due to this brake control, the vehicle 500 can automatically be slowed down or stopped.

As described above, the vehicle control system 300 can perform the steering control or the brake control for the vehicle 500 based on the disparity image 115 received from the stereo camera 10. Due to this configuration, the safety of the vehicle 500 improves during operation.

In the above description, an object to be captured by the stereo camera 10 is described as an area ahead of the vehicle 500. However, no limitation is intended thereby. In other words, the stereo camera 10 may be mounted in the vehicle so as to capture a rear view or side view of the vehicle 500. In such a configuration, the stereo camera 10 can detect the distance to a following vehicle in a rear direction of the vehicle 500 or the distance to another vehicle travelling beside the vehicle 500 in parallel. Accordingly, the controller 301 can perform the above controlling operation upon detecting danger when, for example, the traffic lane in which the vehicle 500 is travelling is to be changed or two lanes of traffic are about to join into one.

Moreover, when it is determined that the risk of collision is increasing in a reversing operation to park the vehicle 500 based on the disparity image 115 of a specific thing, such as an obstacle behind the vehicle 500, detected by the stereo camera 10, the controller 301 can perform the above controlling operation.

As illustrated in FIG. 4, the controller 3 is a central processing unit (CPU) that executes a program read from the auxiliary memory 5 to the main memory 4. The main memory 4 is a memory including, for example, a nonvolatile read-only memory (ROM) and a volatile random access memory (RAM). The auxiliary memory 5 is, for example, a memory card, and the communication interface 6 is an interface used to communicate with external device through the network.

The programs that are executed by the stereo camera 10 are integrated in advance into the ROM included in the main memory 4. A detailed description of these programs is given below.

Note also that it is not always necessary for the programs to be integrated in advance into the main memory 4 as described above. For example, the programs may be in a format that can be installed on the stereo camera 10 later, and the programs in such a format may be stored in a computer-readable recording medium and distributed as a program product for computers. Such a computer-readable recording medium includes, for example, a compact disc read-only memory (CD-ROM), memory card, compact disc-recordable (CD-R), and a digital versatile disk (DVD).

Alternatively, the programs may be stored on a computer for distribution that is connected to a network such as the Internet, such that the stereo camera 10 may download the programs through the network and install the downloaded programs thereon.

In the case of the stereo camera 10, the controller 3 reads and executes a program from the ROM to enable the functions as will be described later in detail.

Note also that some of or the entirety of these functions may be enabled by hardware such as an integrated circuit (IC) instead of the software. The stereo camera 10 according to the present embodiment includes two discrete cameras. However, the number of capturing units is not limited to two, and it is satisfactory as long as there is one or more capturing unit. For example, a monocular camera that is provided with one capturing unit may be configured in a similar manner to the above.

Next, the principle of operation of how the stereo camera 10 measures the distance is described.

Figure 5:
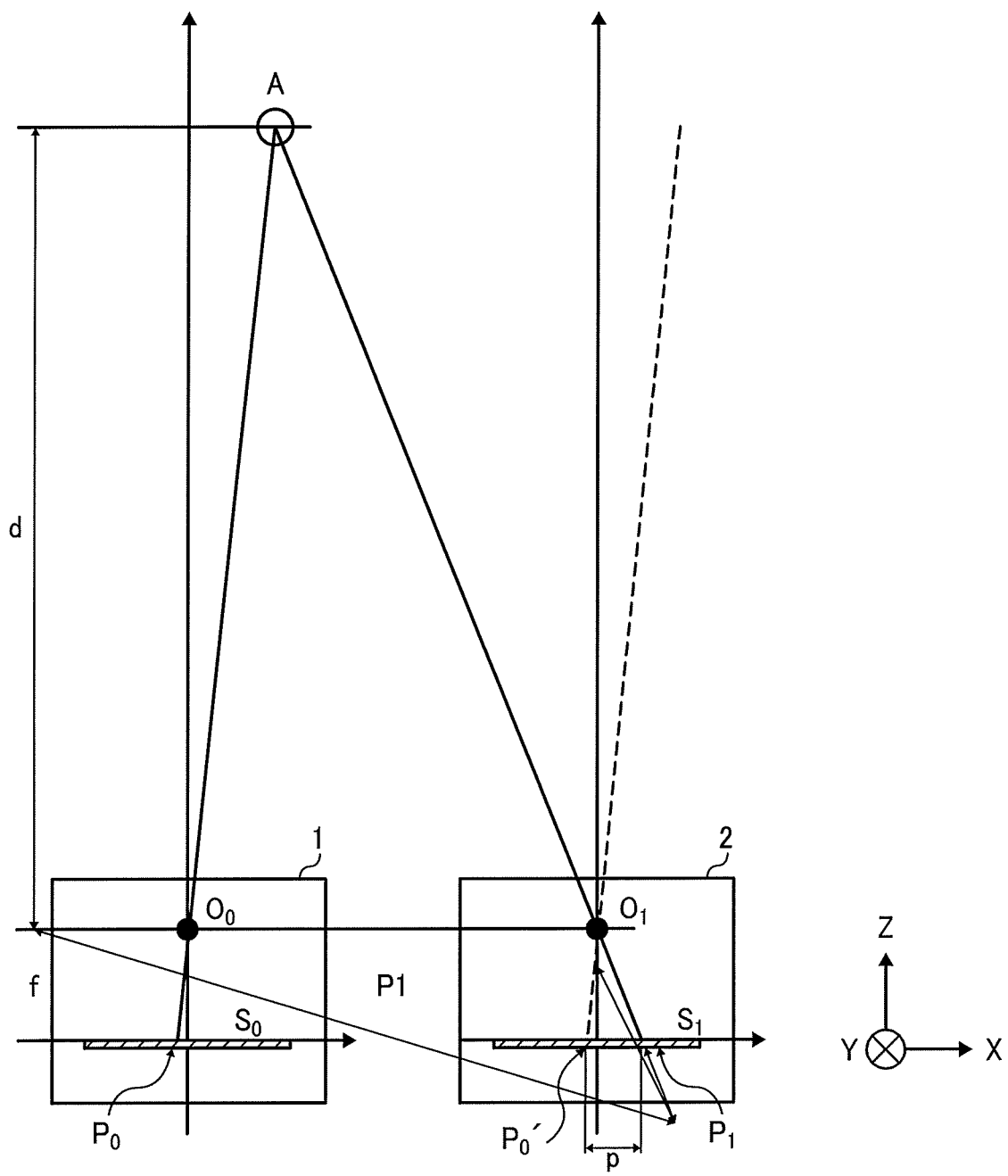
FIG. 5 is a schematic diagram of the principle of operation of how a stereo camera measures distance, according to an embodiment of the present disclosure.

FIG. 5 is a schematic diagram of the principle of operation of how the stereo camera 10 measures the distance, according to the present embodiment.

FIG. 5 illustrates the relation between the arrangement of the first camera 1 and the second camera 2 of the stereo camera 10 and a specific thing A included in the object captured by the first camera 1 and the second camera 2. In FIG. 5, the X-axis direction indicates the direction in which the first camera 1 and the second camera 2 are aligned, and the Z-axis direction indicates the direction orthogonal to the X-axis direction, which is towards the specific thing A, i.e., the optical-axis direction of the first camera 1 and the second camera 2. Moreover, the Y-axis direction indicates the direction orthogonal to both the X-axis direction and the Z-axis direction.

In FIG. 5, "f" indicates the focal length of the first camera 1, and "$O_0$" indicates the optical center. Moreover, in the imaging element provided for the first camera 1, "$S_0$" indicates the capturing plane on which the image of the specific thing A is formed. In a similar manner, "f" indicates the focal length of the second camera 2, and "$O_1$" indicates the optical center. Moreover, in the imaging element provided for the second camera 2, "$S_1$" indicates the capturing plane on which the image of the specific thing A is formed. Each of the capturing plane $S_0$ and the capturing plane $S_1$ faces the Z-axis direction, and are orthogonal to the optical-axis direction of the first camera 1 and the second camera 2. Note also that the first camera 1 and the second camera 2 are disposed at positions that are away from each other in the X-axis direction by base-line length B.

The image of the specific thing A that is at a position away from the optical center $O_0$ of the first camera 1 by distance d in the Z-axis direction is formed at a position $P_0$ that is a point of intersection of the straight line A-$O_0$ and the capturing plane $S_0$. On the other hand, the same image of the specific thing A is formed at a position $P_1$ on the capturing plane $S_1$ of the second camera 2.

In FIG. 5, a position $P_0'$ indicates a point of intersection of the capturing plane $S_1$ and a straight line that passes through the optical center $O_1$ of the second camera 2 and is parallel with the straight line A-$O_0$, and a disparity p indicates the disparity between the position $P_0'$ and the position $P_1$. The disparity p corresponds to the amount of displacement between the positions at which the image of specific thing A is formed when the same image of the specific thing A is captured by the first camera 1 and the second camera 2. In the following description, this amount of displacement between the image forming positions is referred to as the disparity p.

As illustrated in FIG. 5, the triangle A-$O_0$-$O_1$ and the triangle $O_1$-$P_0'$-$P_1$, as defined by the conditions as above, have similar figures. Accordingly, the distance d to the specific thing A can be obtained by the formula "B×f/p". As described above, in order to calculate the distance d to the specific thing A using the stereo camera 10, the base-line length B that is the separation distance between the first camera 1 and the second camera 2, the focal length f of the cameras, and the disparity p that is the amount of displacement between the positions at which the image of specific thing A is formed should be clarified.

Next, the image processing device 11 provided for the stereo camera 10 according to the present embodiment is described with reference to FIG. 6.

Figure 6:
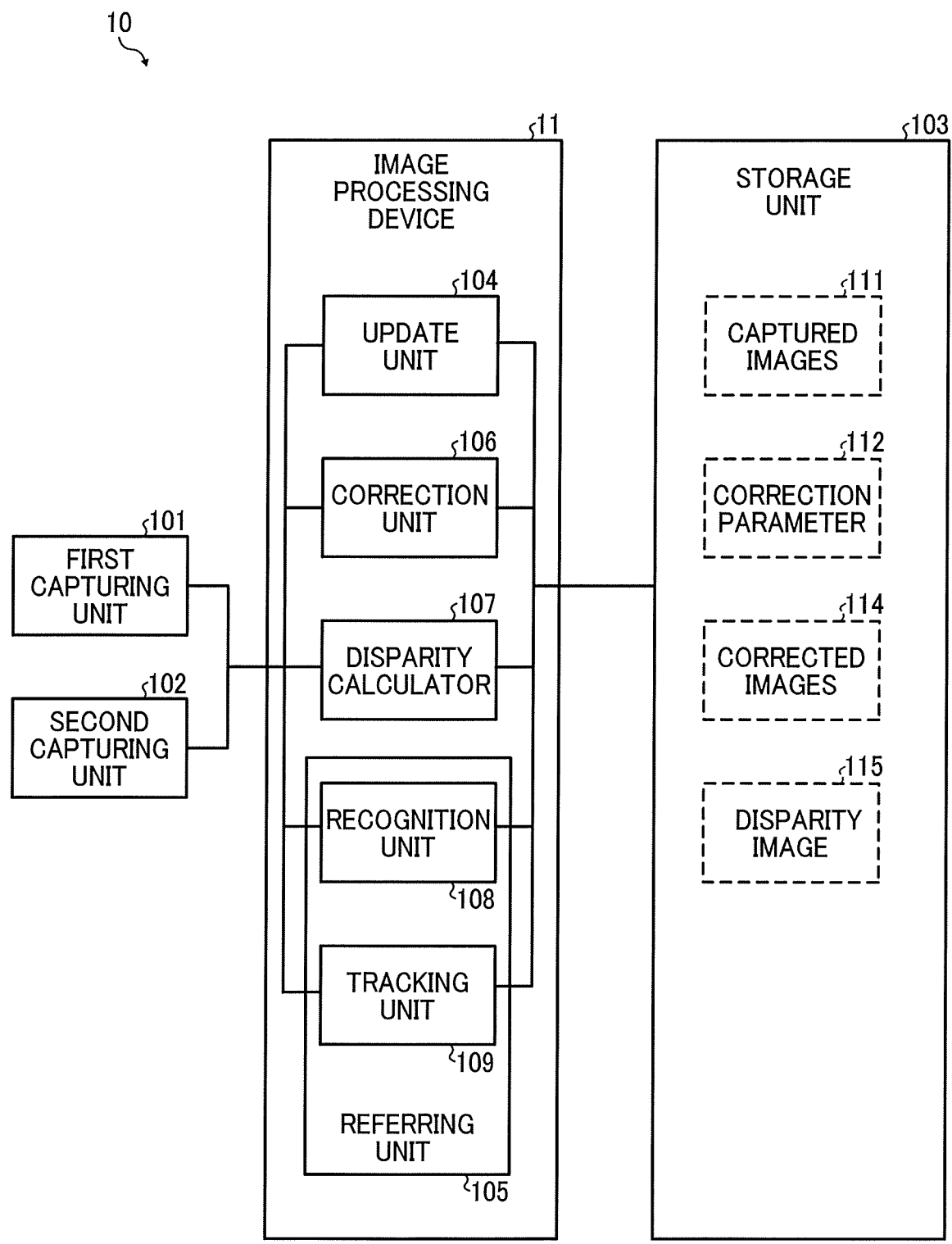
FIG. 6 is a schematic block diagram illustrating a functional configuration of a stereo camera according to an embodiment of the present disclosure.

FIG. 6 is a schematic block diagram illustrating a functional configuration of the stereo camera 10 according to the present embodiment.

As illustrated in FIG. 6, the stereo camera 10 includes a first capturing unit 101, a second capturing unit 102, an image processing device 11, and a storage unit 103. The image processing device 11 is implemented by programs that are executed using the hardware resources (see FIG. 4) of the stereo camera 10 as described above.

The image processing device 11 included in the stereo camera 10 includes an update unit 104, a correction unit 106, a disparity calculator 107, and a referring unit 105 provided with a recognition unit 108 and a tracking unit 109. The functional blocks of the image processing device 11 are implemented by programs that are executed using the hardware resources (see FIG. 4) of the stereo camera 10 as described above. Note that disparity calculator 107, the recognition unit 108, and the tracking unit 109 may be separated from the image processing device 11 and executed on different hardware apart from the stereo camera 10.

The recognition unit 108 performs recognition processes to recognize a specific thing included in the captured images obtained by the first capturing unit 101 and the second capturing unit 102. Such recognition processes may be implemented by any known processing method such as the template matching and the histogram of oriented gradients (HOG).

The tracking unit 109 performs tracking processes to track the specific thing recognized in the previous frame of the captured images obtained by the first capturing unit 101 and the second capturing unit 102. Such tracking processes may be implemented by any known processing method such as a method using an optical flow.

The first capturing unit 101 controls the capturing operation of the first camera 1, and perform operations to generate a first captured image based on a signal output from the imaging element of the first camera 1. The second capturing unit 102 controls the capturing operation of the second camera 2, and perform operations to generate a second captured image based on a signal output from the imaging element of the second camera 2. Due to the first capturing unit 101 and the second capturing unit 102, the first camera 1 and the second camera 2 can capture images in such a manner that the capturing timings of these two cameras are synchronized. In other words, the first captured image and the second captured image are obtained by capturing images at the same time in the same direction.

The first captured image and the second captured image are stored by the storage unit 103 in the RAM included in the main memory 4 as the captured images 111. When the first captured image and the second captured image are not to be distinguished from each other in the following description, they may be referred to simply as the captured images 111. Note also that the first capturing unit 101 and the second capturing unit 102 correspond to the capturing unit.

The storage unit 103 perform operations to store various kinds of information sent from the first capturing unit 101, the second capturing unit 102, the update unit 104, the correction unit 106, and disparity calculator 107 in the RAM or ROM included in the main memory 4. Moreover, the storage unit 103 perform operations to read the various kinds of information stored in the RAM or ROM. As illustrated in FIG. 6, the various kinds of information stored in the RAM or ROM by the storage unit 103 includes, for example, captured images 111, a correction parameter 112, corrected images 114, and disparity images 115.

The update unit 104 reads the captured images 111 stored in the RAM or ROM, and generates the correction parameter 112 based on the captured images 111. Then, the update unit 104 stores the generated correction parameter 112 in the RAM or ROM.

The correction parameter 112 is used to correct the displacement in coordinate between the first captured image and the second captured image due to the displacement of the first camera 1 and the second camera 2 over time. The update unit 104 generates the correction parameter 112 at prescribed time intervals, and stores the generated correction parameter 112 in the RAM or ROM. When the correction parameter 112 is already stored in the RAM when the correction parameter 112 is generated, the update unit 104 overwrites the old correction parameter 112 at prescribed time intervals using the newly generated correction parameter 112. Such overwriting processes may be referred to as the update processes of the correction parameter 112.

Before the update processes of correction parameter 112 are performed, it is desired that the newly generated correction parameter 112 be once written and stored in the ROM. By so doing, the latest correction parameter 112 can be protected even if the power of the stereo camera 10 is turned off in a preliminary step of the update processes. Due to this structure, as long as the correction parameter 112 is stored in the ROM when the power of the stereo camera 10 is turned on, the RAM may be initialized using the latest correction parameter 112 stored in the ROM.

Note also that the update processes of the correction parameter 112 may be performed using any desired method selected from various types of methods. For example, the correction parameter 112 may be updated by performing approximation based on a pair of the coordinates before the conversion and the coordinates after the conversion, using, for example, the method of least squares.

The correction unit 106 reads the correction parameter 112 stored in the RAM by the storage unit 103, and performs correcting processes on the captured images 111 using the read correction parameter 112. Due to these correcting processes, the corrected images 114 are generated from the captured images 111. The generated corrected images 114 are stored in the RAM by the storage unit 103.

Next, the correcting processes that are performed by the correction unit 106 are described. As previously described above, the captured images 111 that are stored in the RAM include the first captured image and the second captured image. The correction parameter 112 serves as a correction factor that is used in a correction formula for correcting the displacement in coordinate between the first captured image and the second captured image due to the displacement of the first camera 1 and the second camera 2 over time. For example, a correction formula that uses the correction parameter 112 is as in Formula 1 below.

$$x' = a_0 a_1 x + a_2 y + a_3 x^2 + a_4 xy + a_5 y^2$$

$$y' = b_0 + b_1 x + b_2 y + b_3 x^2 + b_4 xy + b_5 y^2 \qquad \text{<Formula 1>}$$

In the above correction formula, x and y indicate the coordinates before the conversion, and x' and y' indicate the coordinates after the conversion. The correction parameter 112 includes the coefficients $a_0$ to $a_5$ and $b_0$ to $b_5$ in the correction formula in Formula 1. In other words, the storage unit 103 stores these $a_0$ to $a_5$ and $b_0$ to $b_5$ in the RAM.

Alternatively, correcting processes may be performed in the above correction formula, where x and y indicate the coordinates of the corrected image 114 and x' and y' indicate the coordinates of the captured image 111 that is the image before the correction. In other words, the correcting processes where the above correction formula is used may be performed with reference to the coordinates after the coordinate transformation or with reference to the coordinates before the coordinate transformation.

Note also that the correction parameter 112 may be, for example, a look-up table, instead of the coefficients of a polynomial expression as above. For example, the correction values including the amount of displacement of pixels in the X-direction and the amount of displacement of pixels in the Y-direction may be stored in advance for each pixel or each group of pixels, and these correction values may be used as the correction parameter 112. The use of a polynomial expression is desirable because the amount of stored correction parameter 112 can be reduced.

As described above, the corrected images 114, which are stored in the RAM of the main memory 4 by the storage unit 103, are obtained as the correction unit 106 performs correcting processes on the captured images 111 using Formula 1 as above and correction parameter 112.

Next, the correcting processes where the correction unit 106 corrects the displacement of coordinates in the captured images 111 are described.

Figure 7:
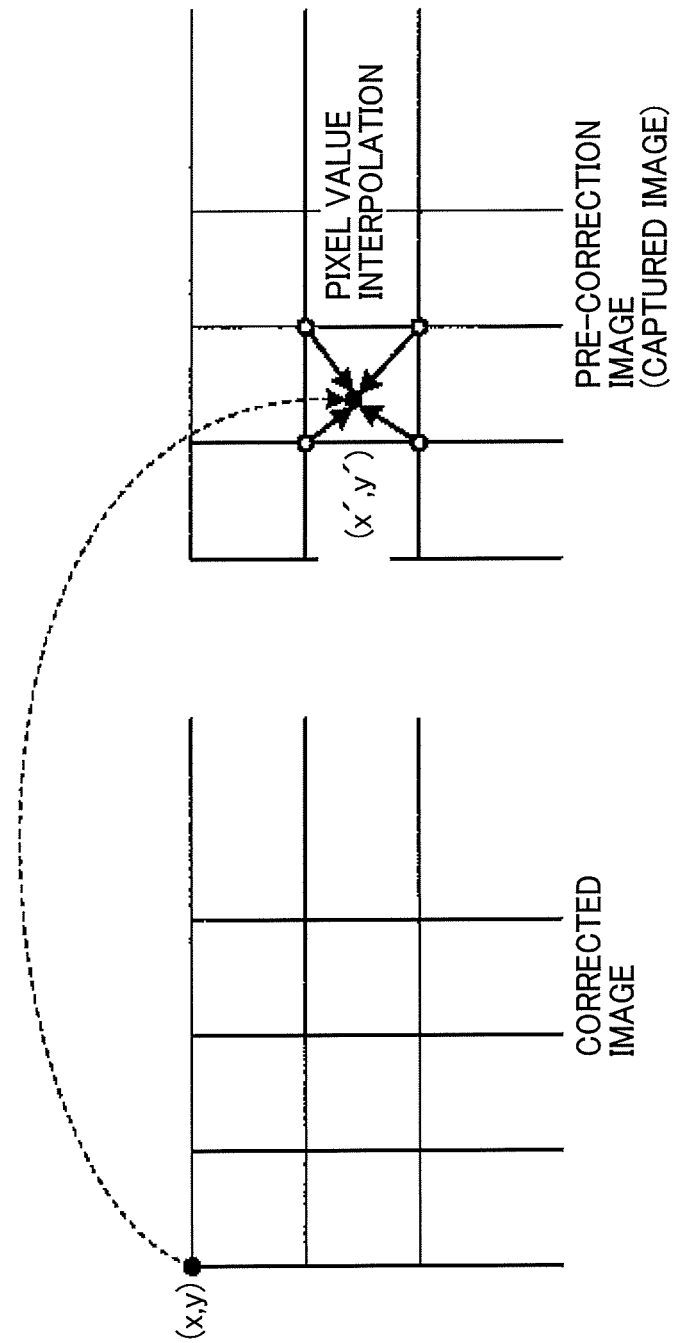
FIG. 7 is a schematic diagram of correction of displacement of coordinates in captured images, which is performed in a stereo camera, according to an embodiment of the present disclosure.

FIG. 7 is a schematic diagram of correction of displacement of coordinates in the captured images 111, which is performed in the stereo camera 10, according to the present embodiment.

The correction of displacement of coordinates that is performed by the correction unit 106 is coordinate transformation. The correction unit 106 perform operations to convert the coordinates of the corrected image 114 that is an image after the correction and the coordinates of the captured image 111 that is an image before the correction, using the correction formula and correction parameter 112 as described above.

In order to determine the pixel value of the corrected image 114, the pixel value of the corresponding captured image 111 is referred to in correction formula. In so doing, the values of the coordinates after the conversion may include a number other than integers. In order to handle such a situation, as indicated by dotted lines in FIG. 7, the correction unit 106 performs pixel value interpolation to replace the pixel values of the coordinates whose coordinate values are not integers with neighboring pixel values on the captured image 111.

The correction unit 106 performs pixel value interpolation, for example, by performing bilinear interpolations. The correction unit 106 performs the pixel value interpolation and the coordinate transformation using the above correction formula on all the pixels, and performs geometric correction on the captured images 111 to generate the corrected images 114.

As illustrated in FIG. 6, the disparity calculator 107 perform operations to calculate the disparity p based on the principle of distance measurement as described above, using the corrected images 114 obtained by correcting the captured images 111. Then, the disparity calculator 107 uses the disparity p to generate the disparity image 115 that includes the disparity information of the coordinates of the captured images 111. The storage unit 103 stores the generated disparity image 115 in the RAM.

The disparity calculation method in the disparity calculator 107 is equivalent to the disparity calculation method in the known coordinate stereo cameras that are disposed in parallel. For example, when the first captured image is set as the reference image, an index value of the correlation between two image areas on the first captured image and the second captured image is calculated, while shifting an image area around a feature point extracted from the first captured image and a candidate image area on the second captured image to be compared with, on a pixel-by-pixel basis. An index value of the correlation is, for example, obtained by comparing the sums of values of brightness of the pixels of two image areas. For example, a sum of absolute difference (SAD) and a normalized cross-correlation (NCC) may be used as a value that serves as an index of correlation. The neighboring values of the maximum value of the calculated values are complemented using, for example, a parabola, to calculate the disparity p with precision that is equal to or less than the precision on a pixel-by-pixel basis.

As the disparity p that is smaller than one pixel has a low degree of reliability, disparity calculator 107 the disparity p that is smaller than one pixel is rounded up to one pixel. In other words, the smallest disparity pixel in the stereo camera 10 is one pixel.

In the stereo camera 10, the processes of each unit that are implemented by the above programs are performed at regular time intervals. Accordingly, the capturing processes of the captured images 111, the calculating and updating processes of the correction parameter 112, the generating and storing processes of the corrected images 114, and the generating and storing processes of the disparity image 115 are repeatedly performed at regular time intervals. In other words, in the stereo camera 10, the disparity image 115 is repeatedly generated and stored in the RAM included in the main memory 4.

As described above, the stereo camera 10 periodically performs a set of processes, where the capturing processes of the captured images 111 and the update processes of the correction parameter 112 are performed, and then the disparity image 115 is generated.

Here, the erroneous recognition of a specific thing in the vehicle control system 300, which occurs when the update processes of correction parameter 112 are performed on the stereo camera 10 side while the vehicle control system 300 is recognizing or tracking a specific thing such as an obstacle, is described. When the disparity image 115 is generated based on the updated correction parameter 112, the vehicle control system 300 may recognize a specific thing such as an obstacle in a different way even if the disparity image 115 is based on the same captured image 111.

For example, it is assumed that the disparity p of an obstacle or the like in the disparity image 115, which is generated when the stereo camera 10 captures the obstacle or the like that is 100 meters (m) away from the vehicle 500 in reality, is one pixel. Moreover, it is assumed in the stereo camera 10 that the disparity on the captured image 111 including the above obstacle or the like has an error of −0.5 pixel. If this stereo camera 10 is used to generate disparity image 115 based on the captured image 111 obtained from a certain frame, the disparity p of the above obstacle or the like becomes 0.5 pixel due to the error, where the disparity p should be one pixel. In the recognition processes of the vehicle control system 300 that are based on the above result, the distance that corresponds to 0.5 pixel is recognized, and thus the distance to the obstacle or the like is recognized as 200 m.

While the vehicle control system 300 is recognizing or tracking an obstacle or the like, the correction parameter 112 may be updated in the next frame on the stereo camera 10 side, and accordingly, the disparity image 115 is generated based on the corrected image 114 where an error in the disparity, as described above, has properly been corrected. In such cases, the error of −0.5 pixel has little influence on the disparity p of the above obstacle or the like, and thus the disparity p in that frame becomes one pixel. In other words, although the distance to the obstacle or the like was recognized as 200 m in the previous frame, the vehicle control system 300 recognizes the distance to the obstacle or the like as 100 m in the present frame. When the vehicle control system 300 predicts the distance to the obstacle or the like in the next frame based on the above results, the distance is 0 m. In such cases, the vehicle control system 300 may predict a collision with an obstacle or the like and carry out hard braking or the like in order to avoid that obstacle or the like.

As known in the art, the vehicle control system 300 sets a margin. More specifically, the vehicle control system 300 performs collision judgment a plurality of times before carrying out the controlling operation as above. In other words, only when a possibility of collision is expected in the judgment across several frames, the vehicle control system 300 performs steering control or brake control on the vehicle 500 to ensure security and stability in the vehicle control. Due to such a configuration, undesired control is not always performed even under the above conditions. However, it is desired that the reliability of the stereo camera 10 itself be high.

As known in the art, as long as the correcting processes of the stereo camera 10 are properly functioning, offset in coordinates is immediately corrected. Accordingly, the impact of an error in the disparity as described above is little in most cases. However, for example, just after the stereo camera 10 is turned on, when the automatic calibration is updated for the first time, and when the properties and characteristics of the camera vary widely within a short period of time, a set of large displacement in coordinate may be measured at a time. If the correction unit 106 corrects such displacement in coordinates, the distance in the measurement results may vary widely.

Note that cases in which the properties and characteristics of the stereo camera 10 vary widely within a short period of time include for example, when the vehicle 500 is moved from shade to a sunny place, and the temperature changes caused by the operation of an air conditioner inside the vehicle etc. In the present embodiment, in order to deal with the changes over time or the changes in temperature as above automatic calibration is performed when the vehicle 500 is traveling. The automatic calibration may be implemented by a known method.

In order to prevent erroneous recognition of a specific thing such as an obstacle as above in the vehicle control system 300, in the present embodiment, the referring unit 105 that includes the recognition unit 108 and the tracking unit 109 performs the processes as follows.

When the correction parameter 112 is updated by the correction unit 106, the referring unit 105 that is provided with the recognition unit 108 and the tracking unit 109 updates the referring status of a specific thing such as an obstacle included in the captured images 111 to a not-yet-referred status. The referring status in the present embodiment indicates a state in which a specific thing is being recognized by the recognition unit 108, or a state in which a specific thing has been recognized and the specific thing is being tracked by the tracking unit 109. The not-yet-referred status in the present embodiment indicates a state in which a specific thing is being recognized by the recognition unit 108 and a state in which a specific thing is being tracked by the tracking unit 109 have been initialized (reset).

In the present embodiment, for example, when a specific thing is recognized by the recognition unit 108, a recognition flag R is set to a group of pixels that correspond to the specific thing in the captured images 111. The phrase "recognition flag R is set" herein indicates setting a value "1" to the recognition flag R. In other words, the group of pixels where the value of the recognition flag R is set to "1" are recognized by the recognition unit 108, and are tracked by the tracking unit 109. In the present embodiment, when there are pixels to which the recognition flag R is set, i.e., when the value of the recognition flag R is "1", the status is in a referring status where recognition is made by the recognition unit 108 and tracking is being performed by the tracking unit 109. When the value of the recognition flag R is set from "1" to "0", the initialization as above is performed.

When the referring status of a specific thing is updated to a not-yet-referred status as the correction parameter 112 is updated, i.e., when the value of the recognition flag R is changed from "1" to "0", the recognition unit 108 and the tracking unit 109 use the corrected images 114 that are obtained by correcting the captured images 111 based on the updated correction parameter 112, and performs recognition processes or tracking processes (i.e., referring processes) on a specific thing.

On the other hand, when the referring status of a specific thing is maintained as the correction parameter 112 is not updated, i.e., when the value of the recognition flag R is maintained at "1", the recognition unit 108 and the tracking unit 109 use the results of the previous referring processes (results of recognition or results of tracking), and performs recognition processes or tracking processes (i.e., referring processes) on a specific thing.

The recognition unit 108 and the tracking unit 109 may update the referring status of a specific thing to a not-yet-referred status when the distance to the specific thing is equal to or longer than predetermined distance. Due to this configuration, a specific thing at short distance, which is important in vehicle control, can keep being referred to on a continuous basis. On the other hand, a specific thing at a long distance may be set to a not-yet-referred status, and that specific thing is recognized again from scratch. Accordingly, erroneous recognition of the specific thing can be prevented, and the level of security of the vehicle control system 300 can be increased.

Next, the flow of referring processes that is performed by the stereo camera 10 according to the present embodiment are described.

Figure 8:
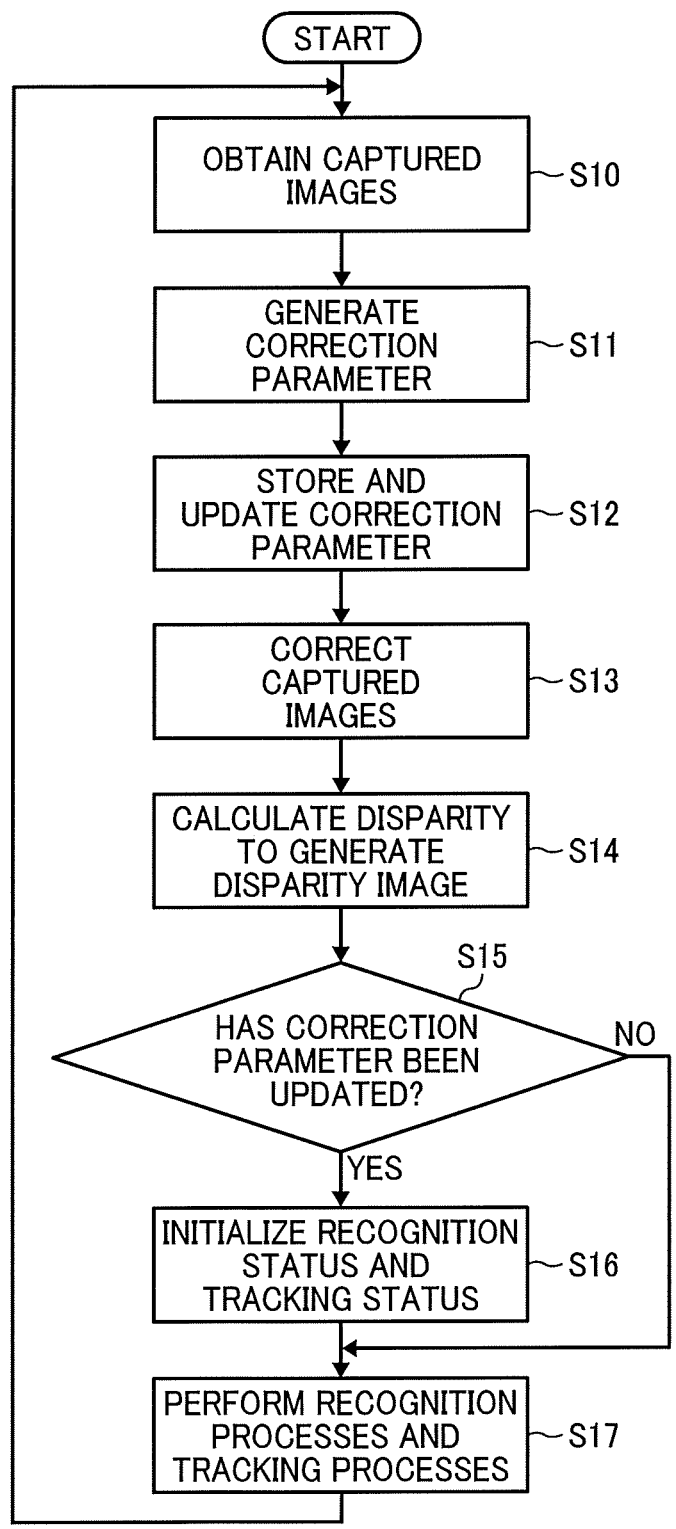
FIG. 8 is a flowchart of referring processes performed in a stereo camera, according to an embodiment of the present disclosure.

FIG. 8 is a flowchart of referring processes performed in the stereo camera 10, according to the present embodiment.

As illustrated in FIG. 8, the first capturing unit 101 and the second capturing unit 102 firstly capture an object and obtain the captured images 111 (including a first captured image and a second captured image) (step S10). Then, the update unit 104 based on the captured images 111 generate a coefficient (i.e., the correction parameter 112) for a correction formula that is used to correct the displacement in coordinate on the captured images 111 due to the displacement over time of one of or both the first capturing unit 101 and the second capturing unit 102 (step S11).

Next, the update unit 104 stores the generated correction parameter 112 in the storage unit 103, and updates the correction parameter 112 (step S12). Then, the correction unit 106 corrects the captured images 111, using the updated correction parameter 112, to generate and store the corrected images 114 (step S13). The disparity calculator 107 calculates a disparity, using the corrected images 114, to generate the disparity image 115 (step S14).

Then, the recognition unit 108 and the tracking unit 109 use the update unit 104 to determine whether the correction parameter 112 has been updated (step S15). When it is determined that the correction parameter 112 has been updated ("YES" in step S15), the recognition unit 108 or the tracking unit 109 initializes (resets) the referring status including the recognition status and the tracking status (step S16). In other words, for example, the value of the recognition flag R is changed from "1" to "0". Then, the disparity calculator 107 generates the disparity image 115 from the corrected images 114, and the recognition unit 108 performs recognition processes using the generated disparity image 115 and the tracking unit 109 performs tracking processes (step S17).

By contrast, when it is determined that the correction parameter 112 is not updated ("NO" in step S15), the recognition unit 108 or the tracking unit 109 maintains the referring status including the recognition status and the tracking status. In other words, for example, the value of the recognition flag R is maintained at "1". Then, the tracking unit 109 performs tracking processes using the results of the previous recognition processes (step S17).

When the correction parameter 112 is updated, it is not always necessary to initialize (reset) all the specific things or the like that are being recognized or tracked. For example, the tracking status of only the specific things that are at a long distance from the vehicle 500 equal to or longer than predetermined distance may be initialized, and the tracking status of the specific things that are at short distance may not be initialized even when the correction parameter 112 is updated. This is because a specific thing at short distance appears in a relatively large figure on the captured image compared with a specific thing at a long distance and such a specific thing at short distance is trackable to a certain degree even when the corrected images 114 vary due to the update of the correction parameter 112. By contrast, a specific thing at a long distance appears in a small figure on the captured image and thus there is a high probability that such a specific thing at a long distance is recognized in error.

As described above, in the stereo camera 10 according to the present embodiment, captured images are corrected using a correction parameter generated based on the captured images of an object, and corrected images are generated. Then, a disparity is calculated using the corrected images, and a disparity image is generated. Then, when the correction parameter has been updated, the stereo camera 10 initializes the referring status (the recognition status or the tracking status), and when the correction parameter is not updated, the stereo camera 10 maintains the referring status. Due to this configuration, erroneous recognition can be reduced when a specific thing is to be recognized using corrected captured images.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing device, comprising:
    circuitry configured to
        recognize and perform tracking of a specific object present in a first captured image captured by at least one capturing unit, and set a recognition status of the specific object to a first status indicating that the specific object has been recognized in the first captured image and will be tracked in a second captured image captured subsequent to the first captured image;
        correct a displacement in coordinates between the first captured image and the second captured image, using a correction parameter stored in a memory,
        generate a new correction parameter, based on the second captured image, and update the correction parameter stored in the memory to the generated new correction parameter,
        determine whether the correction parameter used to correct the displacement has been newly updated in the memory;
        when determining that the correction parameter has been newly updated, update the recognition status of the specific object included in the second captured image to a second status, wherein the second status of the specific object indicates a state in which the specific object has not been recognized and is not being tracked, so as to cause the circuitry to newly perform a recognition process to recognize the specific object using the second captured image; and
        when determining that the correction parameter has not been newly updated, not update the recognition status of the specific object to the second status.

2. The image processing device according to claim 1, wherein when the specific object is at a distance equal to or longer than a prescribed distance, the circuitry is further configured to update the recognition status of the specific object to the second status.

3. The image processing device according to claim 1, wherein
    when the recognition status of the specific object is updated to the second status, the circuitry is further configured to perform the recognition process to recognize the specific object using a corrected image obtained by correcting the second captured image based on the updated correction parameter, and
    when the recognition status of the specific object is maintained, the circuitry is further configured to perform the recognition process using a result of the recognition process at a previous time.

4. The image processing device of claim 3, wherein when the recognition status of the specific object is updated to the second status, the circuitry is further configured to perform the recognition process.

5. The image processing device according to claim 1, wherein
    the first status indicates a state in which the specific object has been recognized by the circuitry or a state in which the specific object is being tracked by the circuitry.

6. An imaging device, comprising:
    the image processing device according to claim 1;
    the at least one capturing unit that captures an image including the specific object; and
    the memory that stores the correction parameter.

7. The imaging device according to claim 6, wherein
    the at least one capturing unit comprises two capturing units, and
    the imaging device further comprises a disparity calculator configured to calculate a disparity of the specific object based on a corrected image obtained by correcting, using the correction parameter, the captured image including the specific object, the captured image being captured by each of the two capturing units.

8. A control system to control a device, comprising:
the imaging device according to claim 6; and
a controller configured to control operation of at least one subsystem of the device based on information obtained using the imaging device.

9. A device, comprising:
the at least one subsystem of the device; and
the control system according to claim 8 to control the at least one subsystem of the device.

10. The imaging device of claim 6, wherein the at least one capturing unit includes a first camera and a second camera, and the circuitry is further configured to generate the new correction parameter and correct the displacement between the first captured image and the second captured image, which is due to the displacement of the first and second cameras over time.

11. The image processing device of claim 1, wherein the circuitry is further configured to generate the new correction parameter at predetermined time intervals.

12. The image processing device of claim 1, wherein the circuitry is further configured to generate the correction parameter, which is used in a correction formula by the circuitry to correct the displacement, the correction parameter including a plurality of coefficients.

13. The image processing device of claim 1, wherein the circuitry is further configured to correct the displacement in the coordinates in horizontal and vertical directions using the correction parameter.

14. A method of processing an image, the method comprising:
recognizing and performing tracking of a specific object present in a first captured image captured by at least one capturing unit, and setting a recognition status of the specific object to a first status indicating that the specific object has been recognized in the first captured image and will be tracked in a second captured image captured subsequent to the first captured image;
generating a correction parameter, based on the second captured image, and update an existing correction parameter stored in a memory to the generated correction parameter;
correcting displacement in coordinates of the captured image, using the updated correction parameter;
determining whether the correction parameter used to correct the displacement has been newly updated in the memory;
when determining that the correction parameter has been newly updated, updating the recognition status of the specific object included in the second captured image to a second status in response to updating the correction parameter in the memory, wherein the second status of the specific object indicates a state in which the specific object has not been recognized and is not being tracked, so as to cause the circuitry to newly perform a recognition process to recognize the specific object using the second captured image; and
when determining that the correction parameter has not been newly updated, not updating the recognition status of the specific object to the second status.

15. A computer-readable non-transitory recording medium storing a program for causing a computer to execute the method of claim 14.

* * * * *